United States Patent
Klomsdorf et al.

(10) Patent No.: US 6,885,322 B2
(45) Date of Patent: Apr. 26, 2005

(54) APPARATUS AND METHOD FOR TRANSMITTER PHASE SHIFT COMPENSATION

(75) Inventors: Armin Klomsdorf, Libertyville, IL (US); Dale G. Schwent, Schaumburg, IL (US); Robert S. Trocke, Caledonia, WI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/634,248

(22) Filed: Aug. 5, 2003

(65) Prior Publication Data

US 2005/0032483 A1 Feb. 10, 2005

(51) Int. Cl.[7] .............................................. H03M 1/06
(52) U.S. Cl. ...................................... 341/118; 341/111
(58) Field of Search ................................ 341/111, 118, 341/120, 137; 375/261, 281, 347, 200, 202, 206, 296, 297, 316, 320; 330/52, 107, 136, 149, 151, 10, 124 R; 455/91, 67.1, 115

(56) References Cited

U.S. PATENT DOCUMENTS

| | | | | |
|---|---|---|---|---|
| 5,175,879 A | * | 12/1992 | Ellingson et al. ............. 455/126 |
| 5,590,155 A | * | 12/1996 | Yasuda ........................ 375/261 |
| 5,668,839 A | * | 9/1997 | Bernasconi et al. ......... 375/347 |
| 5,898,339 A | * | 4/1999 | Maruyama et al. .......... 330/151 |
| 6,266,321 B1 | * | 7/2001 | Pehkonen et al. ........... 370/206 |
| 6,292,122 B1 | * | 9/2001 | Younis et al. ................ 341/143 |
| 6,552,609 B1 | * | 4/2003 | Hamada et al. ............. 330/149 |
| 6,598,232 B1 | * | 7/2003 | McAlear ..................... 725/126 |
| 6,677,820 B1 | * | 1/2004 | Miyatani ..................... 330/149 |
| 2002/0098812 A1 | * | 7/2002 | Sourour et al. ............... 455/91 |

* cited by examiner

*Primary Examiner*—Michael Tokar
*Assistant Examiner*—Linh Van Nguyen
(74) *Attorney, Agent, or Firm*—Vedder, Price, Kaufman & Kammholz, P.C.

(57) ABSTRACT

A transmitter circuit (10) includes a phase shifter (20) that receives phase shift compensation and timing data (40), and an amplifier (30) that receives a control signal (70) to initiate an efficiency enhancement technique. The phase shifter (20) receives the phase shift compensation and timing data (40), and the amplifier (30) receives the control signal (70) at a pre-defined relative time such that the compensation phase shift by the phase shifter (20) compensates for a predetermined phase change in the amplifier (30) to produce an RF output signal (80) with a reduced predicted phase change.

25 Claims, 7 Drawing Sheets

APPARATUS AND METHOD FOR TRANSMITTER PHASE SHIFT COMPENSATION

FIELD OF THE INVENTION

The present invention relates generally to a power amplifier circuit and more particularly, to a power amplifier circuit for providing an RF output signal at a plurality of desired power output levels.

BACKGROUND OF THE INVENTION

Many wireless communication protocols provide for transmitters, operating within a communication network, which are capable of transmitting at varying levels of RF output signal power. One reason for having varying levels of RF output signal power is to accommodate mobile transmitters, which may be located at a varying distance from a base station. In some instances, the wireless communication protocol requires that the signal being received by the base station is received at a relatively constant or fixed RF output signal power level.

Examples of such protocols include Code Division Multiple Access (CDMA) and Wideband Code Division Multiple Access (WCDMA). To accommodate this requirement, transmitter wireless devices such as wireless telephones, wireless personal data assistants (PDAs), pagers, two-way radios, and other types of wireless devices will transmit at one of several power output levels, dependent upon the level at which the signal is being received. Other examples, where the transmitted output power can be varied, include Enhanced Data Rates for Global Systems for Mobile Communications Evolution (EDGE) and Global System for Mobile communications (GSM) which provides for a range of output power control of mobile transmitters between 20 dB and 30 dB, which is controllable in steps of 2 dB, and earlier analog cellular standards, which call for seven 4 dB steps in power output levels of the radio transmitter. Further, multimode wireless devices are designed to transmit communication signals of different modulation schemes using a single power amplifier. Therefore, the single power amplifier must also be capable of transmitting at the power output levels required for each of the different modulation schemes.

The single power amplifier in the wireless device, however, is typically optimized for operation at the highest power level. Consequently, power amplifiers typically operate at less than optimal efficiency at low power levels, and therefore the power consumption of these amplifiers may be reduced if the operating efficiency is increased.

One previous technique, which has been used to enhance operating efficiencies at lower power output values, has included reducing the bias signal supplied to the power amplifier. A further technique, which has been used to enhance operating efficiencies at lower power output values, is to adjust the load impedance coupled to the output of the power amplifier. Adjusting the load impedance of the power amplifier allows the power amplifier to operate at a higher level of efficiency for different output power levels of the power amplifier. However, such techniques to enhance operating efficiencies may cause transmitter phase discontinuities in the RF output signal resulting in significant errors in a receiver when attempting to receive a signal transmitted with phase discontinuities. A significant phase shift, such as, for example, typically of 30 degrees to 90 degrees, occurs coincident with a load impedance change to the power amplifier. A phase shift less than 30 degrees or greater than 90 degrees may also occur.

Yet another technique for enhancing the efficiency of a power amplifier involves a power amplifier with a stage bypass or alternatively a power amplifier having the ability to turn off or adjust power supplied to individual stages within the power amplifier. However, these techniques also generate a phase discontinuity in the power amplifier. A significant consequence of phase discontinuity in the power amplifier is the degradation of transmitted data and an increased generation of spurious signals in the desired transmission channel and the generation of spurious signals entering adjacent channels in the communication system. For example, phase discontinuities cause corruption of the modulated signal resulting in a temporary degradation in the performance of receivers such as base stations listening to the affected channels. The frequent and repetitive use of the efficiency enhancement techniques may occur frequently enough to further degrade the communication channel.

According to one technique for reducing the effects of phase shifting, a phase shifter simply alters the phase of a signal into a power amplifier in response to a control signal from a microprocessor. However, this technique generally changes the phase of a signal without coordinating the timing of the phase compensation signal relative to the initiation of an efficiency enhancement technique. As a result, the phase compensation signal may actually increase the amount of phase discontinuity in the power amplifier because the phase compensation signal may be timed inappropriately with respect to the application of the efficiency enhancement technique. For example, if the phase compensation signal is not properly timed with respect to the initiation of an efficiency enhancement technique, the signals may not cancel each other but may result in a greater phase discontinuity in the power amplifier. Therefore, the phase change caused by the implementation of a phase compensation signal that is out of synchronization with the phase change induced by the initiation of an efficiency enhancement technique may not result in the reduction or elimination of the phase change induced by the efficiency enhancement technique. Depending on the relative timing of the signals, larger phase discontinuities in the power amplifier may occur due to the introduction of an unsynchronized phase compensation signal. As a result, this phase compensation technique may not improve but instead degrade the performance characteristics in the communication channel.

BRIEF DESCRIPTION OF THE DRAWINGS

The present invention is illustrated by way of example and not limitation in the accompanying figures, in which like reference numerals indicate similar elements, and in which.

DETAILED DESCRIPTION OF THE PREFERRED EMBODIMENT

Figure 1:
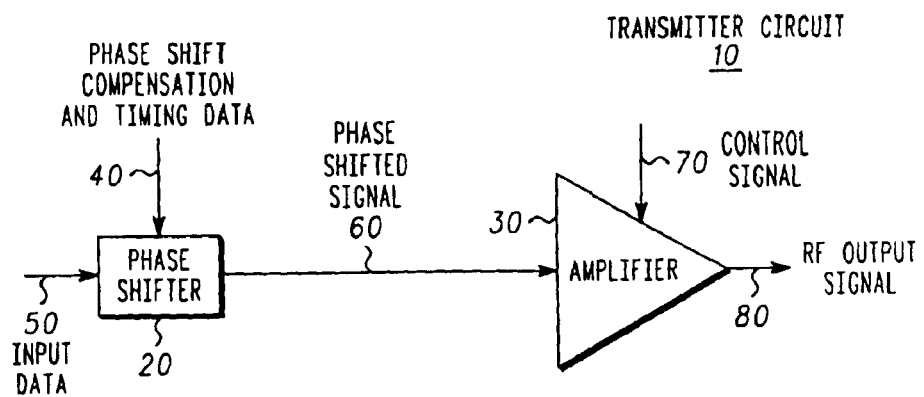
FIG. 1 is a block diagram of a transmitter circuit according to one embodiment of the invention.

A transmitter circuit and method compensates for phase changes induced in a power amplifier due to the implementation of an efficiency enhancement technique. The transmitter circuit includes a phase shifter that receives phase shift compensation and timing data, and an amplifier that receives a control signal to initiate one or more of the efficiency enhancement techniques. The phase shifter receives the phase shift compensation and timing data, and the amplifier receives the control signal at a pre-defined relative time such that the compensation phase shift by the phase shifter compensates for a predetermined phase change in the amplifier to produce an RF output signal with a reduced predicted phase change. The phase shifter synchronizes the application of the phase compensation with respect to the initiation of the efficiency enhancement technique in order to reduce or eliminate the phase change induced in the power amplifier as a result of the efficiency enhancement technique. The phase shifter within the transmitter circuit provides the compensation phase shift in a synchronized manner with respect to the initiation of the efficiency enhancement technique in order to reduce or substantially eliminate the amount of the phase disturbance within the RF output signal. The phase shift compensation mitigates the degradation in performance caused by the initiation of the efficiency enhancement technique.

An amplification method produces phase shift compensation and timing data and a control signal at a predefined relative time in response to system based circuit activation data. The system based circuit activation data, for example, represents the initiation of an efficiency enhancement technique. The phase shifter phase shifts the input data by a compensation phase change in response to the phase shift compensation and timing data to produce the phase shifted signal. The control signal is provided to an amplifier at a predefined relative time with respect to producing the phase shift compensation and timing data to produce an RF output signal such that the compensation phase signal in the phase shifted signal reduces a phase disturbance in the RF output signal of the amplifier.

The transmitter circuit may fulfill a multimode role in order to overcome conflicting design requirements, such as reducing phase shifts while operating with either fixed or variable amplitude modulation. The transmitter circuit, therefore, may employ a phase compensation circuit within the amplifier to compensate for phase shifts caused by the use of efficiency enhancement techniques. The phase shift compensation circuit allows the power amplifier to operate at a more optimal level of efficiency and in any one of several different types of modulation modes, because the transmitter circuit adapts to the type of modulation selected. As a result, the transmitter circuit may accommodate multiple types of modulation modes, each potentially having one or more RF output signal power levels, while minimizing the amount of phase discontinuity in the RF output signal.

FIG. 1 illustrates one example of a transmitter circuit 10 including a phase shifter 20 and an amplifier 30. The phase shifter 20 receives phase shift compensation and timing data 40 to phase shift input data 50 by a compensation phase shift thereby producing a phase shifted signal 60. Amplifier 30 is coupled to an output of the phase shifter 20 to receive the phase shifted signal 60. The amplifier 30 causes a predicted phase change to the received phase shifted signal 60 in response to a control signal 70. The phase shifter 20 receives the phase shift compensation and timing data 40, and the amplifier 30 receives the control signal 70 at a predefined relative time, such that the compensation phase shift in the phase shifted signal 60 compensates for the predicted phase change in the amplifier 30 in order to produce an RF output signal 80 with a reduced phase discontinuity.

The input data 50, for example, may be a symbol representing base band data based on a mapping of the base band data into one of a set of symbols as part of the process of modulating the base band signal. For example, phase shift keyed (PSK) modulators receive symbol data to convert the symbol data into phase data using M-Phase PSK modulation where M represents the number of possible phases according to the size of the symbol set. The input data 50 representing symbol data may therefore be also represented on a phase signal constellation map as known in the art. The phase shifter 20 may receive the input data 50 in a digital format and may subsequently digitally phase shift the input data 50 by rotating the input data 50 on the phase constellation map by a compensation phase shift amount in response to receiving the phase shift compensation and timing data 40 and in response to providing the control signal 70 to the amplifier 30 at the predefined relative time. Both the compensation phase shift applied to the input data 50 and the application of the control signal 70 at the predefined relative time are determined such that the compensation phase shift in the phase shifted signal 60 compensates for the predicted phase change in the amplifier 30 to produce the RF output signal 80 with a reduced predicted phase discontinuity. As previously stated, the amplifier 30 causes a predicted phase change to the phase shifted signal 60 received by the amplifier 30 in response to the initiation of an efficiency enhancement technique initiated by the control signal 70.

The control signal 70 may engage any one of several efficiency enhancement techniques as previously discussed, such as adjusting a load impedance at the output of amplifier 30, adjusting a bias of amplifier 30, or bypassing one or more amplifier stages within amplifier 30, or enabling one or more amplifier stages within amplifier 30. Accordingly, control signal 70 may represent the activation of any one or more efficiency enhancement techniques, and in practice, control signal 70 may represent multiple control signals to engage different efficiency enhancement techniques, or vary the degree of a particular efficiency enhancement technique. For example, the control signal 70 may be provided by a phase compensation and time and control circuit, such as a microprocessor, or any other circuit capable of controlling the one or more amplifier stages in accordance with any of the several efficiency enhancement techniques.

According to one embodiment, the phase shift compensation and timing data 40 is synchronized with the input data 50 so that the compensation phase shift occurs at a time least disruptive to a phase change in the input data 50. For example, in a Time Division Multiple Access (TDMA) format, such as the least disruptive time period to initiate an efficiency enhancement technique may be before a transmitter burst, where a burst can correspond to the period of time when data is transmitted and therefore the radio transmitter is on. According to one embodiment, in TDMA formats, the initiation of the compensation phase shift in the phase transmitter may occur during an off period, such as before or after a burst. For CDMA formats, the compensation phase shift may be timed to allow the phase shifted signal 60 to propagate through the amplifier 30 so that the compensation phase change due to the phase shift compensation and timing data is applied just as the phase shifted signal 60 reaches the amplifier 30. The net effect is that the two phase shifts cancel each other out to generate a reduced phase shift or no net phase change in the RF output signal 80.

According to one embodiment, if a compensation phase shift response shape or waveform has been tailored to be the inverse of the predicted or anticipated phase change in the amplifier 30, then there will be no or a reduced phase change in the transient response of the RF output signal 80, resulting in an RF output signal 80 with no or a reduced amount of degradation. For example, the predicted phase change may be based on measured amounts of phase change corresponding to the activation of an efficiency enhancement technique for example, in amplifier 30. According to one embodiment, the two phase shifts would cancel each other out over all time if the phase compensation signal is substantially the inverse of the predicted phase change in the amplifier 30. If, however, the amount of the compensation phase shift is not equal to the amount of the predicted phase change in the amplifier 30, or if the timing of the initiation of the compensation phase shift produced by the phase shifter 20 is not synchronized with the predicted phase change in the amplifier 30, then the two phase shifts may not substantially cancel each other out. If the compensation phase shift is not substantially the inverse of the predicted phase change, then the two phase shifts may not precisely cancel out each other at all times with respect to the initiation of control signal 70. If the two phase shifts do not cancel each other out, some degradation in the RF output signal 80 is likely to occur, although a level of degradation may be tolerable.

Figure 2:
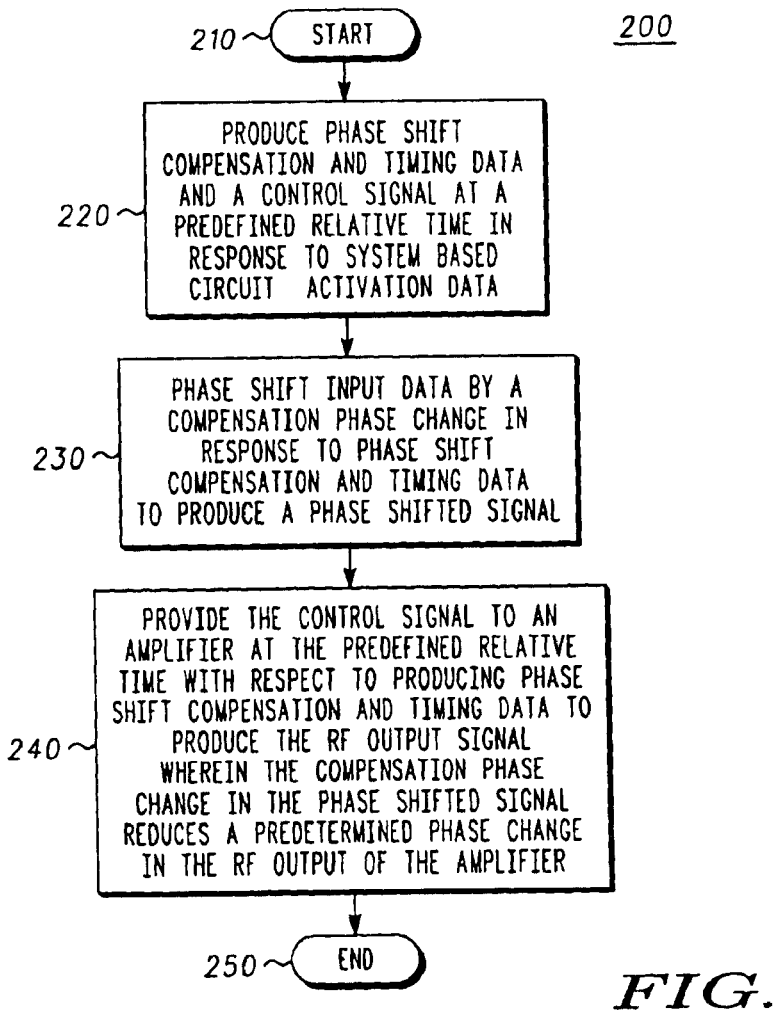
FIG. 2 is a flow chart of an amplification method according to one embodiment of the invention.

FIG. 2 is a block diagram of an amplification method 200 to compensate for a predicted phase change in amplifier 30 according to one embodiment of the invention. The method 200 may be carried out by the transmitter circuit 10. However, any other suitable structure may also be used. It will be recognized that the method 200, beginning with step 210, will be described as a series of operations, but the operations may be performed in any suitable order.

As shown in step 220, the transmitter circuit 10 produces phase shift compensation and timing data 40 and a control signal 70 at a predefined relative time in response to system based circuit activation data. The system based circuit activation data may, for example, represent the initiation of the efficiency enhancement technique as a result of, for example, a change in RF output signal 80 power level. As shown in step 230, phase shifter 20 phase shifts input data 50 by a compensation phase change in response to phase shift compensation and timing data 40 to produce a phase shifted signal 60. As shown in step 240, the control signal 70 is provided to the amplifier 30 at the predefined relative time with respect to producing phase shift compensation and timing data to produce the RF output signal 80. The compensation phase change in the phase shifted signal 60 reduces a predicted phase disturbance in the RF output 80 of the amplifier 30. Although step 250 indicates the end of method 200, it is understood that the steps in method 200 occur continuously as needed.

Figure 3:
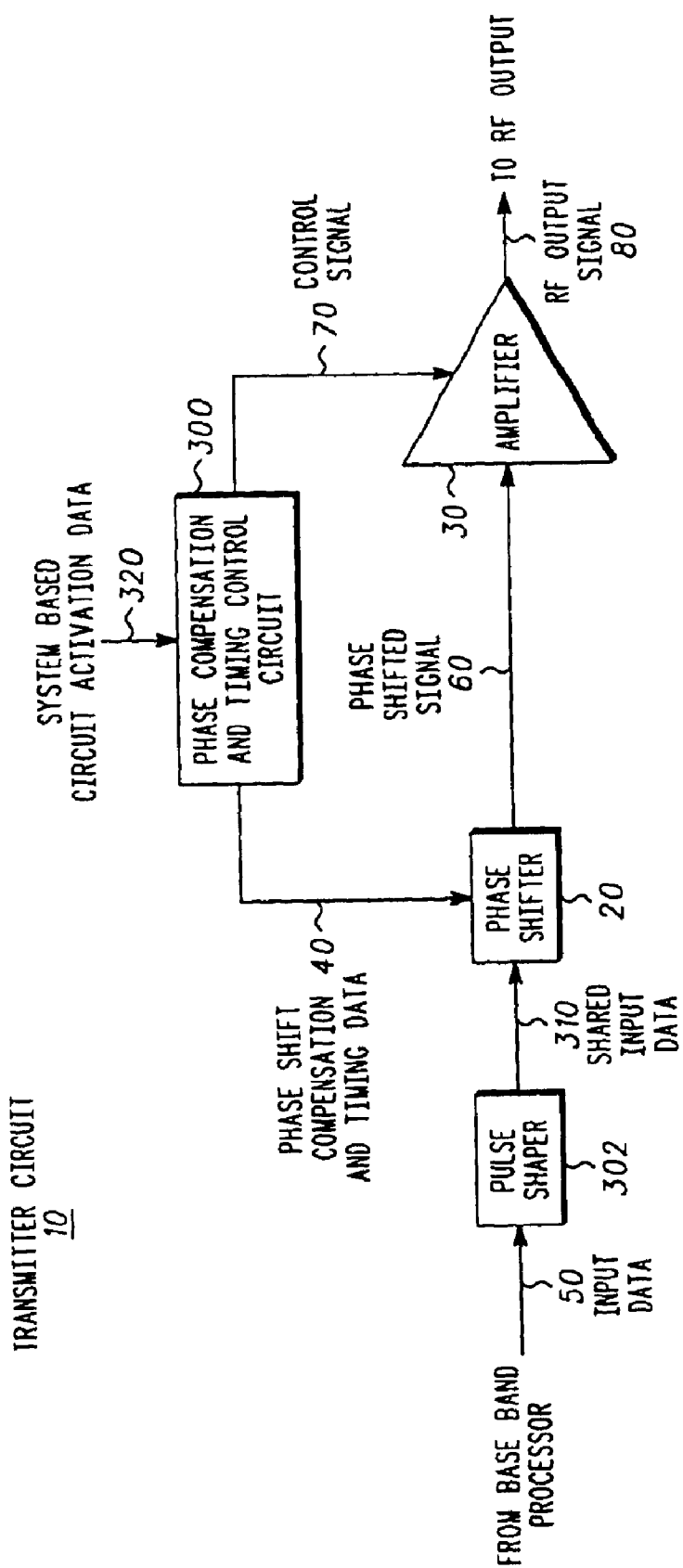
FIG. 3 is a block diagram of a power transmitter circuit employing a pulse shaper according to an exemplary embodiment of the invention.

FIG. 3 is a block diagram of transmitter circuit 10 as previously described including a pulse shaper 302 and a phase compensation and timing control circuit 300. According to one embodiment, the phase compensation and time and control circuit 300 may be a microprocessor or any other suitable circuit for providing the phase shift compensation and timing data 40 and the control signal 70 as described above. For example, a DSP, discrete logic or any suitable combination of hardware, software and firmware may be used. The phase compensation and timing control circuit 300 may further include processing circuitry and a storage unit coupled to the processing circuitry for storing one or more sets of instructions for execution by the processing circuitry. The phase compensation and timing control circuit 300 is coupled to the amplifier 30 to provide the control signal 70. The phase compensation and timing control circuit 300 is also coupled to the phase shifter 20 to provide the phase shift compensation and timing data 40 at the predefined relative time such that the compensation phase shift in the phase shifted signal compensates for the predicted phase change to produce the RF output signal 80 with the reduced predicted phase change. The compensation phase shift in the phase shifted signal 60 compensates for the predicted phase change to produce the RF output signal 80 with, for example, a reduced transient phase change of the RF output signal 80, and a reduced steady state phase change of the RF output signal 80.

As previously described, depending on the amount of the compensation phase shift and the timing of the compensation phase shift with respect to the timing of the control signal 70, the overall phase change in the RF output signal 80 may correspond to a transient phase change of the RF output signal 80. If, for example, the amplitude of the compensation phase shift is initially matched with the amplitude of the predicted phase change in the amplifier 30, but the waveform shapes of the two signals are not optimally synchronized, the transient phase response may be initially reduced, but the response may degrade until the phase changes reach a steady state of zero. If, however, the amplitudes of the compensation phase shift and the predicted phase change in the amplifier 30 are not matched initially, then the application of the phase shift may cause a relatively large transient response although the steady state phase change of the RF output signal may nevertheless eventually settle to zero. Nevertheless, the net phase change response at the RF output signal 80 is a function of the waveform of the compensation phase shift and of the predicted phase change in the amplifier.

According to one embodiment, the compensation phase shift produced in the phase shifted signal 60 in response to the phase shift compensation and timing data 40 has a waveform shape associated with an inverse of the predicted phase change. For example, if both the shape of the compensation phase shift and the shape of the application of the compensation phase shift is substantially an inverse of the predicted phase change in amplifier 30, then the phase shift in the RF output signal 80 will be substantially reduced or eliminated. According to one embodiment, the compensation phase shift produced in the phase shifted signal 60 is substantially the inverse of the predicted phase shift in amplifier 30 with respect to both the amplitude of the compensation phase shift and the precise timing of the application of the compensation phase shift. According to one embodiment, the inverse of the predicted phase change may be represented as the inverse in the time domain, in the frequency domain or any other suitable representation.

Alternatively, or in combination with an inverse waveform described above, the compensation phase shift in the phase shifted signal 60 may be represented, for example, as a step phase shift compensation signal, a ramp phase shift compensation signal and an exponential phase shift compensation signal. According to one embodiment, the compensation phase shift may be applied when a modulation vector on a constellation map is relatively low. The modulation vector may be represented on a constellation map having an amplitude and a phase. Accordingly, when the amplitude of a magnitude crosses a threshold, then the phase shift compensation technique will be activated and then the efficiency enhancement technique will occur thereafter.

The predicted phase change within amplifier 30 is a function of the efficiency enhancement technique employed and the phase difference between sequentially adjacent symbols received from input data 50. Accordingly, the phase compensation and timing control circuit 300 may provide phase shift compensation and timing data 40 that is programmable for any amplitude and for any amount of phase. The phase compensation and timing control circuit 300 may therefore provide the phase shift compensation and timing data 40 and the control signal 70 at a predefined relative time to reduce the resulting phase change in the RF output signal 80. The predefined relative time may be a random time period, a fixed time period, an exponential time period, a period of time before a data burst, the period of time after the data burst, and a programmable amount of time. Further, the predefined relative time may occur before, during or after a CDMA, a TDMA, and a WCDMA time period between data bursts.

Further, the control signal 70 may have a waveform shape associated with the predicted phase change in amplifier 30. For example, the waveform shape of the control signal 70 may correspond to a ramp phase shift waveform, a waveform shape associated with an inverse of the predicted phase change, an exponential phase shift waveform and a programmable phase shift compensation waveform.

Pulse shaper 302 is responsive to the input data 50 to provide shaped input data 310. The shaped input data 310 corresponds, according to one embodiment, to oversampled input data 50. For example, pulse shaper 302 may oversample each symbol received in input data 50 to represent one or more oversampled values for each symbol received from input data 50. Oversampling the input data 50 to produce the shaped input data 310 in effect allows the phase shifter 20 to select the oversampled value for each symbol from input data 50 at the desirable predefined relative time. Oversampling of the input data 50 to a higher sample rate provides suppression of aliased signal energy at the lower harmonics of the received symbol rate of the input data 50. Additionally, the pulse shaper 302 may provide spectral smoothing to the input data 50.

The phase shifter 20 is responsive to the phase shift compensation and timing data 40 to select at least one of the oversampled shaped input data as the selected shaped data and to phase shift the selected shaped input data by a compensation phase shift to produce a phase shifted signal 60 at an output of the phase shifter 20. According to this embodiment, the amplifier 30 is coupled to the output of the phase shifter 20 to receive the phase shifted signal 60. As previously discussed, the amplifier 30 causes a predicted phase change to the received phase shifted signal 60 in response to the control signal 70. The amplifier 30 receives the control signal 70 at a predefined relative time such that the compensation phase shift in the phase shifted signal 60 compensates for the predicted phase change in the amplifier 30 to produce the RF output signal 80 with a reduced resulting phase change.

Figure 4:
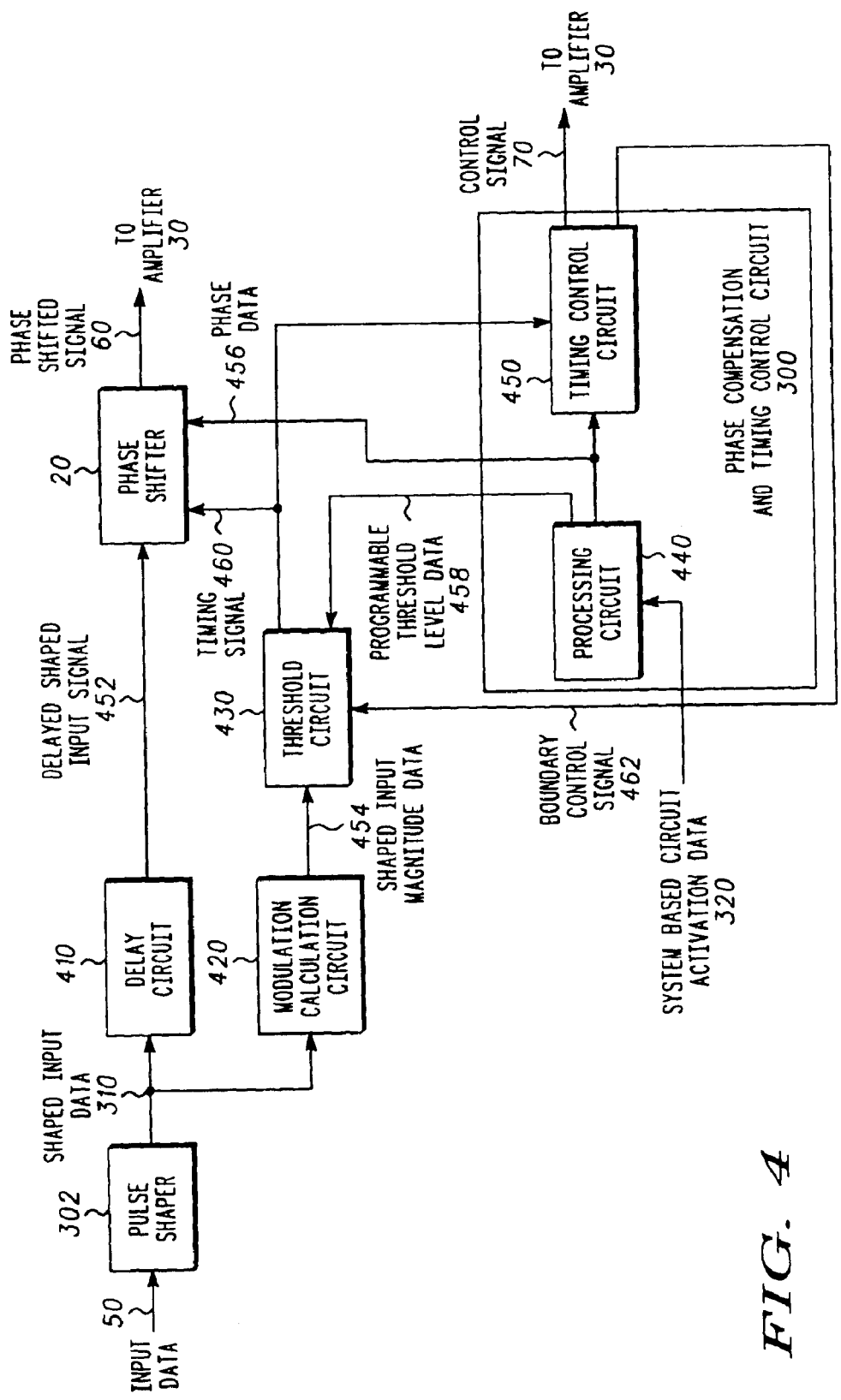
FIG. 4 is a block diagram of a portion of the transmitter circuit with the addition of a delay circuit and a modulation calculation circuit according to one embodiment of the invention.

FIG. 4 illustrates one embodiment of the transmitter circuit 10 further including a delay circuit 410, a modulation calculation circuit 420, a threshold circuit 430 and the phase compensation and timing control circuit 300. According to this embodiment, the phase compensation and timing control circuit 300 further includes a processing circuit 440 and a timing control circuit 450. The delay circuit 410 is coupled to the pulse shaper 302 and is responsive to the shaped input data 310 to produce a delayed shaped input signal 452. The modulation calculation circuit 420 is responsive to the shaped input data 310 to produce the magnitude of the shaped input data 454.

The modulation calculation circuit 420 computes a metric such as the amplitude of the shaped input data 310, to determine an optimal location for initiating the phase compensation. The processing circuit 440 is responsive to the system based circuit activation data 320 to provide phase data 456 to the phase shifter 20 and to provide programmable threshold level data 458 to the threshold circuit 430. The timing control circuit 450 is responsive to the phase data 456 to provide the control signal 70 to the amplifier 30. The threshold circuit 430 is coupled to the modulation calculation circuit 420 to compare the magnitude of the shaped input data 454 with the programmable threshold level data 458. The threshold circuit 430 provides a timing signal 460 to the phase shifter 20 in response to comparing the magnitude of the shaped input data 454 with the programmable threshold level data 458. The phase shifter 20 produces the phase shifted signal 60 in response to the delayed shaped input signal 452, the phase data 456 and the timing signal 460.

The threshold circuit 430 controls the time that the phase shifter 20 will produce the phase shift by issuing the timing signal 460. According to one embodiment, the timing signal 460 is masked off by a boundary control signal 462 produced by the timing control circuit 450 to restrict phase changes to a specific window in time, or to prevent a phase change. For example, the window in time may be a power change interval that occurs between bursts. If the boundary control signal 462 allows phase changes, then the comparison between the magnitude of the shaped input data 454 and the programmable threshold level data 458 results in timing signal 460 being issued.

The threshold circuit 430 compares the value of the magnitude of the shaped input data 454 with the programmable threshold level 458 from the processing circuit 440. When the magnitude of the shaped input data 454 crosses the threshold level defined by the programmable threshold level data 458, the timing signal 460 is asserted, for example, once or any number of suitable times within a change interval. According to one embodiment, the timing signal 460 also acts as an input to the timing control circuit 450 so that it is aware of the exact timing that the phase shifter 20 starts to produce the phase shift. This allows the control signal 70 to be issued with an appropriate delay for the phase shifter's 20 effect to reach the amplifier 30, as described earlier. Some calculations within the modulation calculation circuit 420 may involve future values of the shaped input data 310. The delay circuit 410 ensures that the timing signal 460 can be asserted at the desired point in the delayed shaped input signal 452, even for computations that require future samples.

According to one embodiment, the programmable threshold level data 458 is set at a level such that if the magnitude of the shaped input data 454 is less than the programmable threshold level data 458, then the threshold circuit 430 will assert the timing signal 460. As a result, the timing signal 460 is asserted when a relatively low signal magnitude occurs between adjacent symbols in the shaped input data 310. Since the signal magnitude between adjacent symbols in the shaped input data 310 is relatively low, any resultant phase change in the amplifier 30 will occur at a relatively low signal level. Therefore, the threshold circuit 430 as described above may further improve the performance of the transmitter circuit 10 by selecting a point in time in which the signal magnitude between adjacent symbols in the shaped input data 310 stream are relatively low. At this point in time, phase changes produced in the phase shifter 20 or the amplifier 30 will have a relatively lower impact on the out of band spectrum of the signal. As a result, the performance of the transmitter circuit 10 may be further improved, resulting in less corruption of the RF output signal 80.

Figure 5:
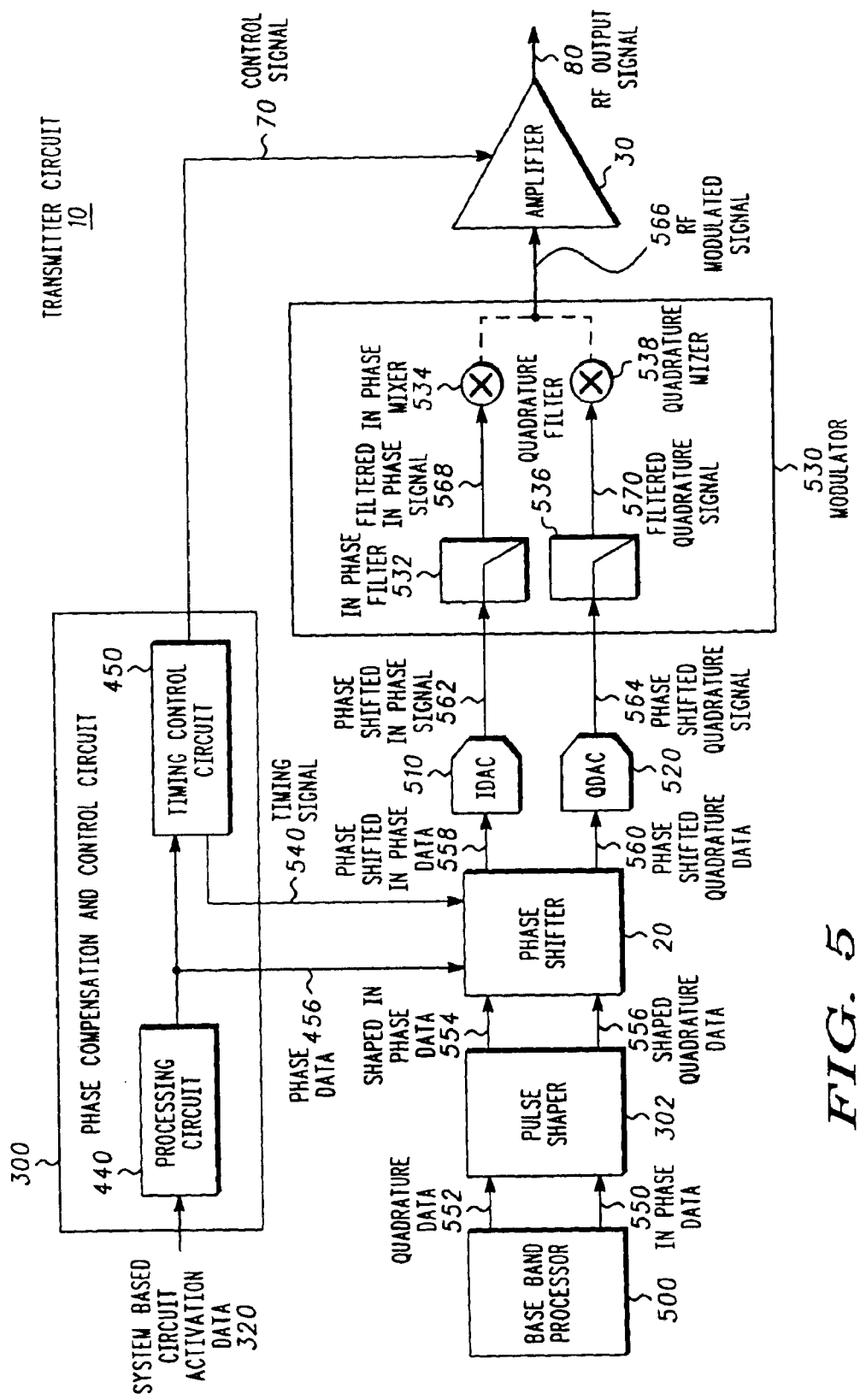
FIG. 5 is a block diagram of the transmitter circuit including an in-phase and quadrature modulator according to one embodiment of the invention.

FIG. 5 illustrates the transmitter circuit 10 further including a base band processor 500, an in-phase digital analog converter (IDAC) 510, a quadrature digital analog converter (QDAC) 520, and a modulator 530. The modulator 530 further includes an in-phase filter 532, an in-phase mixer 534, a quadrature filter 536, and a quadrature mixer 538. The processing circuit 440 is responsive to the system based circuit activation data 320 to provide phase data 456 to the phase shifter 20. The timing control circuit 450 is responsive to the phase data 456 to provide the control signal 70 to the amplifier 30 and to provide a timing signal 540 to the phase shifter 20. The pulse shaper 302 is responsive to in-phase data 550 and quadrature data 552 to provide shaped in-phase data 554 and shaped quadrature data 556 to the phase shifter 20. According to this embodiment, the input data 50 may be represented as the in-phase data 550 and the quadrature data 552 as encoded quadrature data streams. The in-phase data 550 and the quadrature data 552 may be represented graphically as on a constellation phase map. Prior to pulse shape filtering, the constellations may be of a uniform or constant amplitude such as an EDGE constellation, or may be an amplitude modulation type of constellation such as is used in the WCDMA standard. After pulse shape filtering, for example, the constellation may be of a uniform or constant amplitude, such as a GSM constellation.

The phase shifter 20 is operative to produce the phase shifted in-phase data 558 and the phase shifted quadrature data 560 in response to the timing signal 540, the phase data 456, the shaped in-phase data 554, and the shaped quadrature data 556. The in-phase digital to analog converter 510 is responsive to the phase shifted in-phase data 558 to produce a phase shifted in-phase signal 562. Similarly, the quadrature digital to analog converter 520 is responsive to the phase shifted quadrature data 560 to produce a phase shifted quadrature signal 564. Accordingly, the in-phase digital to analog converter 510 and the quadrature digital to analog converter 520 convert the respective digital signals into analog signals, as is known in the art. The modulator 530 is responsive to the phase shifted in-phase signal 562 and the phase shifted quadrature signal 564 to provide an RF modulated signal 566 to the amplifier 30. The phase shifted in-phase signal 562 and the phase shifted quadrature signal 564 represent the fully processed base band signals to be modulated, and have been phase shifted by the desired amount of the compensation phase shift. Undesired sampling spectra are removed in the in-phase filter 532 and the quadrature filter 536 to produce filtered in-phase signal 568 and filtered quadrature signal 570, respectively. In-phase mixer 534 modulates the filtered in-phase signal 568 and the quadrature mixer 538 modulates the filtered quadrature signal 570 to produce the RF modulated signal 566 for amplification by amplifier 30.

Figure 6:
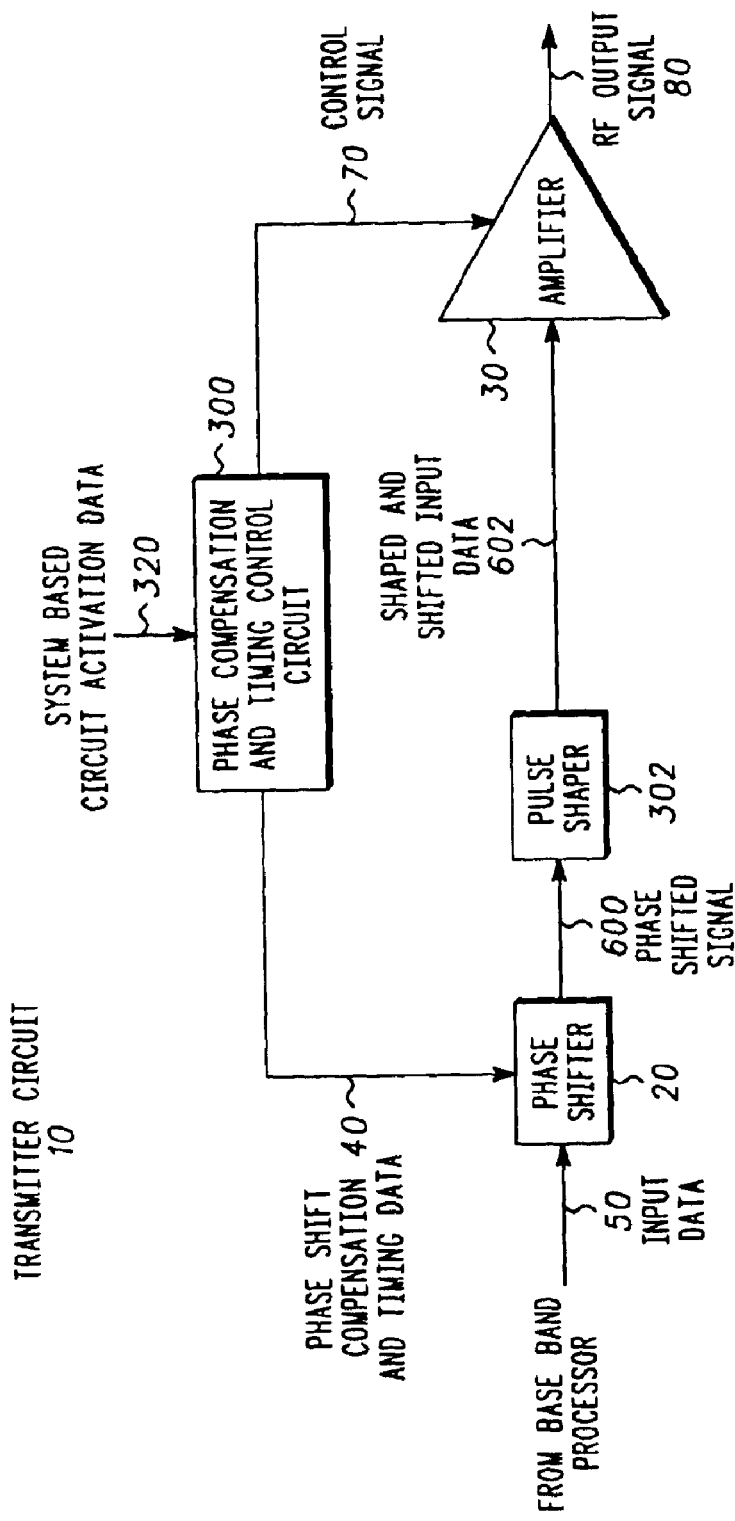
FIG. 6 is a block diagram of the transmitter circuit with a phase shifter providing a phase shifted signal to a pulse shaper according to one exemplary embodiment of the invention.

FIG. 6 is a block diagram of another embodiment of the transmitter circuit 10. The phase shifter 20 is responsive to the phase shift compensation and timing data 40 to phase shift input data 50 by a compensation phase shift to produce a phase shifted signal 600. According to this embodiment, the pulse shaper 302 is coupled to an output of the phase shifter 20 to receive the phase shifted signal 600 and to responsively provide shaped and shifted input data 602. The amplifier 30 receives the shaped and shifted input data 602 from the pulse shaper 302 to produce the RF output signal 80 in response to the control signal 70. The amplifier 30 causes a predicted phase change to the shaped and shifted input data 602 in response to the control signal 70, as previously described.

Figure 7:
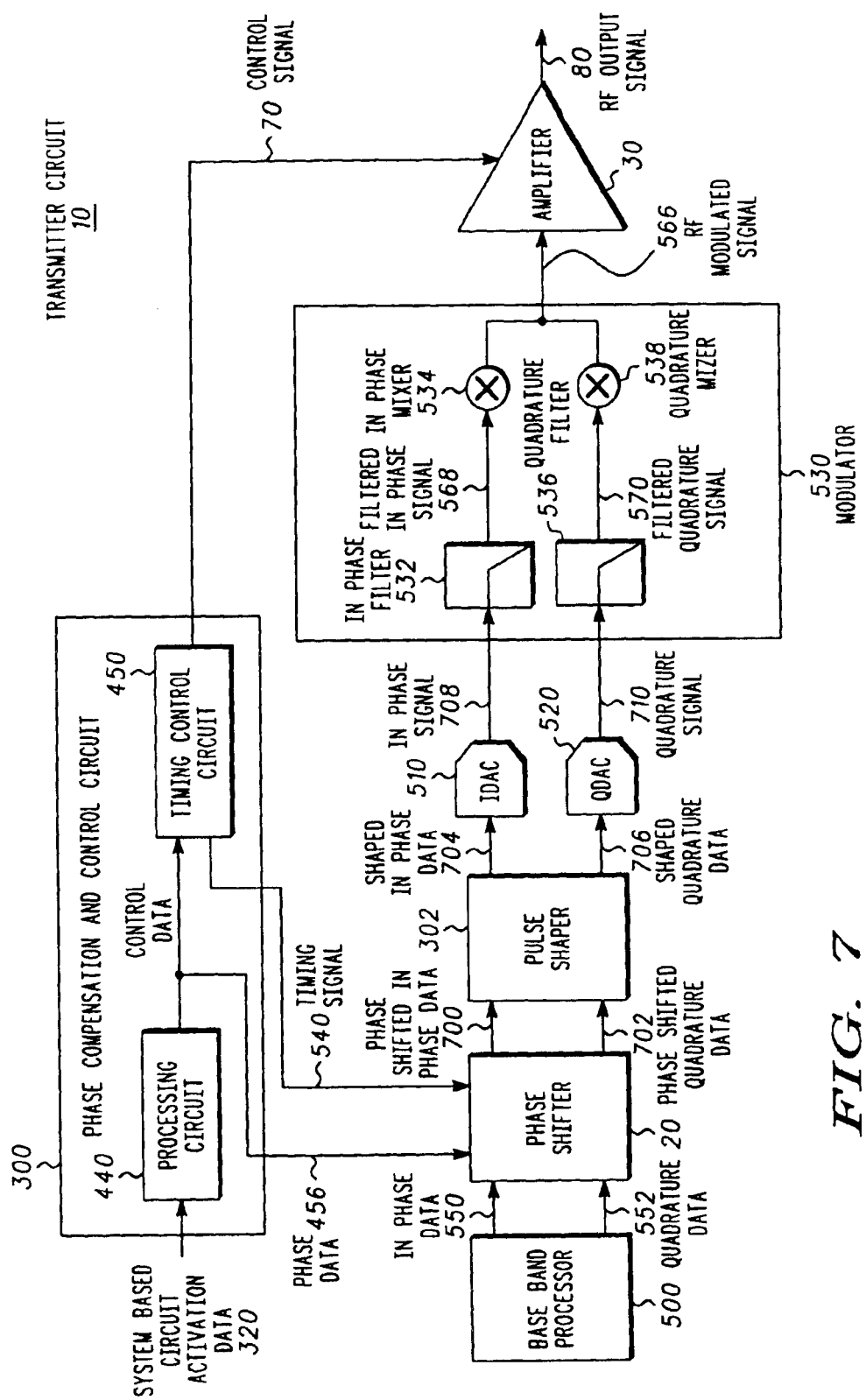
FIG. 7 is a block diagram of a transmitter circuit including a phase shifter, a pulse shaper and a modulator according to one exemplary embodiment of the invention.

FIG. 7 is a block diagram of another embodiment of the transmitter circuit of FIG. 6. The processing circuit 440 within the phase compensation and timing control circuit 300 provides phase data 456 to the phase shifter 20. The time and control circuit 450 within the phase compensation and timing control circuit 300 provides the timing signal 540 to the phase shifter 20 and provides the control signal 70 to the amplifier 30. The phase shifter 20 is operative to produce phase shifted in-phase data 700 and phase shifted quadrature data 702 in response to the phase data 456, the timing signal 540, in-phase data 550 and quadrature data 552. The pulse shaper 302 is responsive to the phase shifted in-phase data 700 and the phase shifted quadrature data 702 to provide shaped in-phase data 704 and shaped quadrature data 706.

The in-phase digital to analog converter 510 is responsive to the shaped in-phase data 704 to produce an in-phase signal 708. The quadrature digital to analog converter 520 is responsive to the shaped quadrature data 706 to produce a quadrature signal 710. The modulator 530 is responsive to the in-phase signal 708 and the quadrature signal 710 to provide the RF modulated signal 566 to the amplifier 30.

According to the embodiment shown in FIGS. 6 and 7, the phase shifter 20 has been placed before the pulse shaper 302. Placing the phase shifter 20 in this location has advantages that make it more desirable for some applications. The phase shifter 20 will operate at the symbol rate of the received in-phase data 550 and the quadrature data 552. The phase shifter 20 will typically involve several multiply and add operations at the symbol rate. By placing the phase shifter 20 prior to oversampling being performed in the pulse shaper 302, these multiply and add operations can be carried out at the symbol rate in accordance with the in-phase data 550 and the quadrature data 552, as opposed to the higher oversampled data rate of the pulse shaper 302 and the corresponding oversampled data rate. As a result, the cost and the current drain relative to placing the phase shifter 20 prior to the pulse shaper 302 is reduced. Additionally, placing the phase shifter 20 prior to the pulse shaper 302 also eliminates or reduces the generation of any undesired spectral components resulting from the add and multiply operations. Any out-of-band spectrum generated by the instantaneous phase shift applied in the phase shifter 20 will be filtered out by the action of the pulse shaper 302, leaving only a smooth change of phase with no out-of-band components.

According to one embodiment, the phase shifted signal 600 includes a plurality of constellation points where at least one of the plurality of constellation points is replaced with a zero data value on the constellation map. As a result, instead of waiting for a sequence of adjacent symbols to provide a relatively small signal amplitude, the phase shifted signal 600 may be replaced with one or more zero data values so that any phase change caused by any of the efficiency enhancement techniques implemented in amplifier 30 will occur at a relatively small signal amplitude, producing reduced out-of-band spectrum in the output signal. For example, one of the phase constellation points in the phase shifted signal 600 may be replaced prior to oversampling. Pulse shaper 302 applies the phase compensation shift at the zero data value and the points after it. According to this embodiment, the phase transition for amplifier 30 is timed to begin on the phase shifter 20 phase transition so that the sharpest phase change will occur when the amplitudes are minimized. Although at least one of the symbols in the input data points in the input data 50 will be changed as a result of using this approach, the resulting data stream will not significantly affect the overall data error rate. Therefore, this approach may be very useful since the overall data error rate is small and the resulting out of band distortion at the RF output signal 80 is very small. As a result, the degradation due to the data error rate is acceptable since any increase in the data error rate is very small.

According to another embodiment, the modulation calculation circuit 420, threshold circuit 430, and other associated blocks described in FIG. 4 may be incorporated into the embodiment shown in FIG. 6. As was the case for the embodiment shown in FIG. 4, this circuitry may be used to determine an optimal location for initiating the phase compensation. One embodiment of the modulation calculation circuit shown in the configuration of FIG. 6 computes the magnitude of the vector difference between any given sample of input data 50, and the subsequent sample after the phase shift has been applied. The programmable threshold level data 458 is set at a level such that if the magnitude of the shaped input data 454 is greater than the programmable threshold level data 458, then the threshold circuit 430 will assert the timing signal 460.

According to another embodiment, using the modulation calculation circuit in the configuration shown in FIG. 6, the modulation calculations are used in conjunction with the replacement of one of the constellation points with a zero data value on the constellation map. In this embodiment, the modulation calculation circuit computes the magnitude of the vector difference between the two samples of input data 50 that immediately precede and follow a candidate constellation point to be replaced with zero. The programmable threshold level data 458 is set at a level such that if the magnitude of the shaped input data 454 is greater than the programmable threshold level data 458, then the threshold circuit 430 will assert the timing signal 460, and the constellation point in question is replaced with the zero value. If the threshold value is not exceeded, then no zero replacement occurs.

Figure 8:
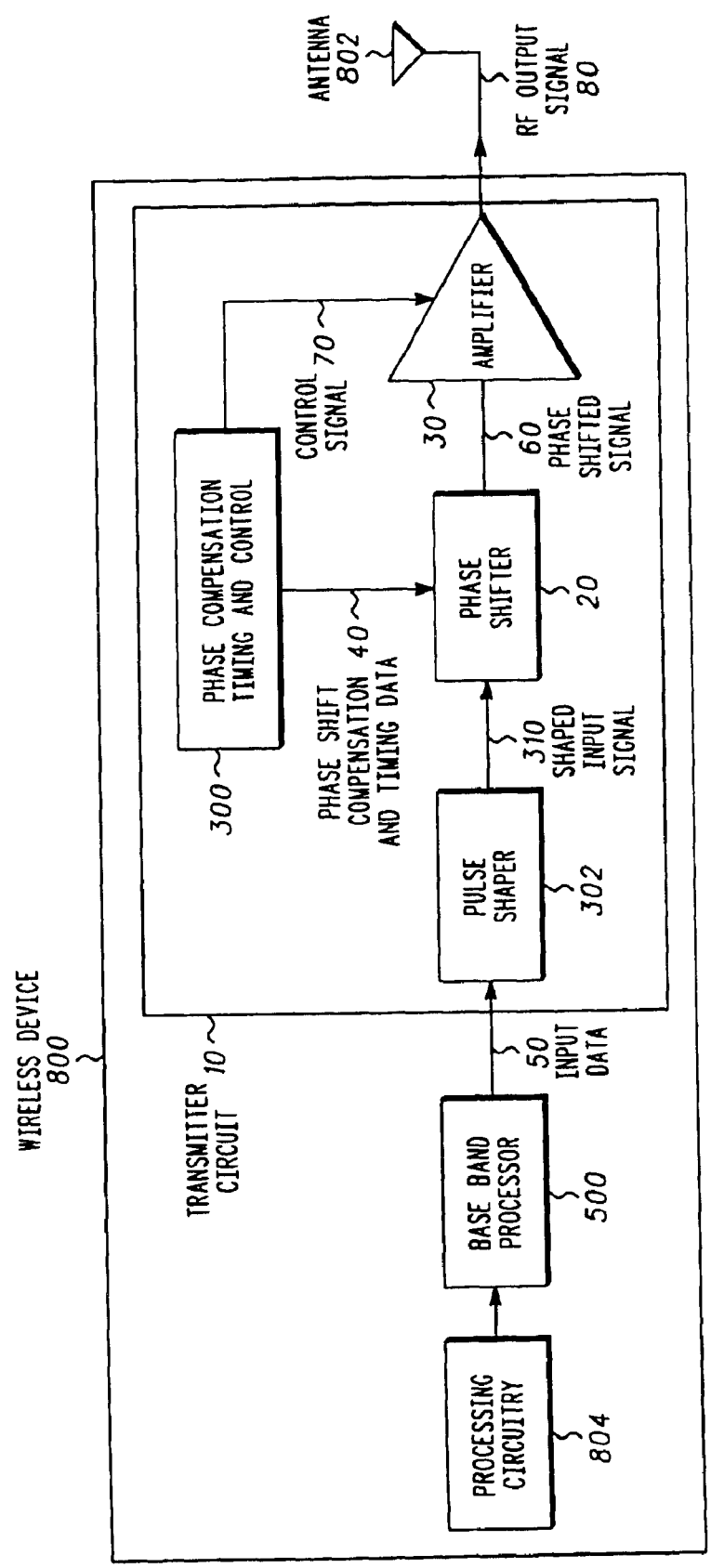
FIG. 8 is a block diagram of a wireless device according to one embodiment of the invention.

FIG. 8 is a block diagram of a wireless device 800 including the transmitter circuit 10, the base band processor 500, an antenna 802 and processing circuitry 804. The base band processor 500 produces the input data 50, as previously described. The antenna 802 is responsive to the RF output signal 80 to transmit the RF output signal 80.

As described above, the input data 50 was phase shifted in order to compensate for a predicted phase change in the amplifier 30 due to, for example, the activation of an efficiency enhancement technique. As also described above, the efficiency enhancement technique is employed as a result of, for example, an increase or a decrease in amplifier output power. As a result, if the output power amplifier requirements change, then the efficiency enhancement technique may be deactivated. Accordingly, if the efficiency enhancement technique is deactivated, then the phase compensation and timing control circuit 300 provides phase shift compensation and timing removal data to the phase shifter to remove the phase shift from the input data 50. The phase shifter 20 receives the phase shift compensation and timing removal data, and the amplifier 30 receives a remove control signal at a predefined relative removal time in order to reduce the phase discontinuity at the RF output signal 80.

Among other advantages, the phase shifter and the phase compensation timing and control circuit 300 accurately compensate for the predicted phase change in the amplifier in order to produce the RF output signal 80 with a reduced predicted phase change. The phase compensation in the RF output signal 80 prevents a significant degradation in a signal received by a receiver, such as a base station receiver either in the desired communication channel or on an adjacent communication channel.

The transmitter circuit 10 may fulfill a multimode role in order to overcome conflicting design requirements, such as operating with linear or non-linear modulation. The transmitter circuit 10, therefore, may employ an amplifier 30 using any suitable efficiency enhancement technique in order to allow the power amplifier within the transmitter circuit 10 to operate with enhanced efficiency in multiple types of modulation modes. As a result, the transmitter circuit 10 may operate in multiple types of modulation modes, at multiple RF output signal power levels, and without significantly degrading the RF output signal.

It will be understood that the implementation of other variations and modifications of the invention and its various aspects will be apparent to those with the ordinary skill in the art, and that the invention is not limited by this specific embodiment as described. It is therefore contemplated to cover by the present invention any and all modifications, variations or equivalents that fall within the spirit and scope of the basic underlying principles disclosed and claimed herein.

What is claimed is:

1. A transmitter circuit comprising:
a phase shifter operatively responsive to phase shift compensation and timing data to phase shift input data by a compensation phase shift amount to produce a phase shifted signal; and
an amplifier coupled to an output of the phase shifter to receive the phase shifted signal, wherein the amplifier causes a predicted phase change to the received phase shifted signal in response to a control signal;
wherein the phase shifter receives the phase shift compensation and timing data and the amplifier receives the control signal at a predefined relative time such that the compensation phase shift in the phase shifted signal compensates for the predicted phase change in the amplifier to produce an RF output signal with reduced phase discontinuity.

2. The transmitter circuit of claim 1 further including a phase compensation and timing control circuit operatively coupled to the amplifier to provide the control signal, and operatively coupled to the phase shifter to provide the phase shift compensation and timing data at the predefined relative time such that the compensation phase shift in the phase shifted signal compensates for the predicted phase change to produce the RF output signal with the reduced phase discontinuity.

3. The transmitter circuit of claim 1, wherein the phase shifted signal reduces at least one of a transient phase change of the RF output signal, and a steady state phase change of the RF output signal.

4. The transmitter circuit of claim 1 wherein the compensation phase shift produced in the phase shifted signal in response to the phase shift compensation and timing data has a waveform shape associated with an inverse of the predicted phase change.

5. The transmitter circuit of claim 1, wherein the compensation phase shift in the phase shifted signal includes at least one of a step phase shift compensation signal, a ramp phase shift compensation signal, an exponential phase shift compensation signal, an inverse of the predicted phase change compensation signal, and a programmable phase shift compensation signal.

6. The transmitter circuit of claim 1, wherein the predefined relative time corresponds to at least one of: a fixed time period, an exponential time period, a period of time before a data burst, a period of time after a data burst, and a programmable amount of time.

7. The transmitter circuit of claim 1, wherein the control signal includes at least one of a waveform shape associated with the predicted phase change, a ramp phase shift waveform, waveform shape associated with an inverse of the predicted phase change, an exponential phase shift waveform and a programmable phase shift compensation signal waveform.

8. The transmitter circuit of claim 1, wherein the phase shifter is operatively responsive to phase shift compensation and timing removal data to remove the phase shift from the input data, wherein the phase shifter receives the phase shift compensation and timing removal data and the amplifier receives a remove control signal at a predefined relative removal time.

9. The transmitter circuit of claim 2 wherein the phase compensation and timing control circuit includes:
   processing circuitry;
   a storage unit coupled to the processing circuitry for storing one or more sets of instructions for execution by the processing circuitry including:
   presorted instructions to receive the system based circuit activation data; and
   presorted instructions operatively responsive to the system based activation data to generate the phase shift compensation and timing signal and the control signal.

10. A transmitter circuit comprising:
    a phase compensation and timing control circuit operatively responsive to system based circuit activation data to produce phase shift compensation and timing data and a control signal;
    a pulse shaper operatively responsive to input data to provide shaped input data, wherein the shaped input data corresponds to oversampled shaped input data;
    a phase shifter operatively responsive to the phase shift compensation and timing data to select at least one of the oversampled shaped input data as selected shaped data and to phase shift the selected shaped input data by a compensation phase shift to produce a phase shifted signal at an output of the phase shifter; and
    an amplifier coupled to the output of the phase shifter to receive the phase shifted signal, wherein the amplifier causes a predicted phase change to the received phase shifted signal in response to the control signal;
    wherein the phase shifter receives the phase shift compensation and timing data and the amplifier receives the control signal at a predefined relative time such that the compensation phase shift in the phase shifted signal compensates for the predicted phase change in the amplifier to produce an RF output signal with a reduced phase discontinuity.

11. The transmitter circuit of claim 10 further including:
    a delay circuit operatively coupled to the pulse shaper and operatively responsive to the shaped input data to produce a delayed shaped input signal;
    a modulation calculation circuit operatively coupled to the pulse shaper and operatively responsive to the shaped input data to produce shaped input magnitude data;
    wherein the phase compensation and timing control circuit includes;
    a processing circuit responsive to system based circuit activation data to provide phase data to the phase shifter and to provide programmable threshold level data;
    a timing control circuit operatively responsive to the phase data to provide the control signal to the amplifier; and
    a threshold circuit to provide a timing signal to the phase shifter in response to comparing the shaped input magnitude data with the programmable threshold level data;
    wherein the phase shifter produces the phase shifted signal in response to the delayed shaped input signal, the phase data, and the timing signal.

12. The transmitter circuit of claim 10:
    wherein the phase compensation and timing control circuit includes:
    a processing circuit operatively responsive to the system based circuit activation data to provide phase data to the phase shifter; and
    a timing control circuit operatively responsive to the phase data and responsive to provide the control signal to the amplifier, and to provide a timing signal to the phase shifter;
    wherein the pulse shaper is operatively responsive to in-phase data and quadrature data to provide shaped in-phase data and shaped quadrature data to the phase shifter;
    wherein the phase shifter is operative to produce phase shifted in-phase data and phase shifted quadrature data in response to the timing signal, the phase data, the shaped in-phase data, and the shaped quadrature data.

13. The transmitter circuit of claim 12 further including:
    an in-phase digital to analog converter operatively responsive to the phase shifted in-phase data to produce a phase shifted in-phase signal;
    a quadrature digital to analog converter operatively responsive to the phase shifted quadrature data to produce a phase shifted quadrature signal; and
    a modulator operatively responsive to the phase shifted in-phase signal and the phase shifted quadrature signal to provide an RF modulated signal to the amplifier.

14. The transmitter circuit of claim 10, wherein the phase shifted signal reduces at least one of a transient predicted phase change of the RF output signal, and a steady state predicted phase change of the RF output signal.

15. A transmitter circuit comprising:
    a phase compensation and timing control circuit operatively responsive to system based circuit activation data to produce phase shift compensation and timing data and a control signal;
    a phase shifter operatively responsive to the phase shift compensation and timing data to phase shift input data by a compensation phase shift to produce a phase shifted signal;
    a pulse shaper operatively coupled to an output of the phase shifter to receive the phase shifted signal, and to responsively provide shaped and shifted input data; and
    an amplifier operatively coupled to an output of the pulse shaper to produce the RF output signal in response to the shaped and shifted input data and the control signal, wherein the amplifier causes a predicted phase change to the shaped and shifted input data in response to the control signal;

wherein the phase shifter receives the phase shift compensation and timing data and the amplifier receives the control signal at a predefined relative time such that the compensation phase shift in the shaped and shifted input data compensates for the predicted phase change in the amplifier to produce an RF output signal with a reduced phase discontinuity.

16. The transmitter circuit of claim 15 wherein:

wherein the phase compensation and timing control circuit includes:

a processing circuit to provide phase data to the phase shifter; and a timing control circuit operative to provide a timing signal to the phase shifter and to provide the control signal to the amplifier;

wherein the phase shifter is operative to produce phase shifted in-phase data and phase shifted quadrature data in response to the phase data, the timing signal, in-phase data and quadrature data;

wherein the pulse shaper is operatively responsive to the phase shifted in-phase data and the phase shifted quadrature data to provide shaped in-phase data and shaped quadrature data.

17. The transmitter circuit of claim 16 including:

an in-phase digital to analog converter operatively responsive to the shaped in-phase data to produce an in-phase signal;

a quadrature digital to analog converter operatively responsive to the shaped quadrature data to produce a quadrature signal; and a modulator operatively responsive to the in-phase signal and the quadrature signal to provide an RF modulated signal to the amplifier.

18. The transmitter circuit of claim 15 wherein the phase compensation and timing control circuit includes:

processing circuitry;

a storage unit coupled to the processing circuitry for storing one or more sets of instructions for execution by the processing circuitry including:

presorted instructions to receive the system based circuit activation data; and presorted instructions operatively responsive to the system based activation data to generate the phase shift compensation and timing signal and the control signal.

19. The transmitter circuit of claim 15 wherein the phase shifted signal includes a plurality of constellation points wherein at least one of the plurality of constellation points is replaced with a zero constellation value.

20. A wireless device comprising:

a phase shifter operatively responsive to phase shift compensation and timing data to phase shift input data by a compensation phase shift to produce a phase shifted signal;

an amplifier coupled to an output of the phase shifter to receive the phase shifted signal, wherein the amplifier causes a predicted phase change to the received phase shifted signal in response to a control signal;

wherein the phase shifter receives the phase shift compensation and timing data, and the amplifier receives the control signal at a predefined relative time such that the compensation phase shift in the phase shifted signal compensates for the predicted phase change in the amplifier to produce an RF output signal with a reduced phase discontinuity;

a base band processor to produce the input data; and an antenna operatively responsive to the RF output signal to transmit the RF output signal.

21. The wireless device of claim 20 further including a phase compensation and timing control circuit operatively coupled to the amplifier to provide the control signal and operatively coupled to the phase shifter to provide the phase shift compensation and timing data at the predefined relative time such that the compensation phase shift in the phase shifted signal compensates for the predicted phase change to produce the RF output signal with the reduced predicted phase change.

22. An amplification method comprising:

producing phase shift compensation and timing data and a control signal at a predefined relative time in response to system based circuit activation data;

phase shifting input data by a compensation phase change in response to the phase shift compensation and timing data to produce a phase shifted signal; and providing the control signal at the predefined relative time with respect to producing the phase shift compensation and timing data to an amplifier to produce an RF output signal;

wherein the compensation phase change in the phase shifted signal reduces phase discontinuity in the RF output signal of the amplifier.

23. The method of claim 22 including:

producing shaped input data in response to the input data, wherein the shaped input data corresponds to oversampled input data;

selecting at least one of the oversampled input data corresponding to each shaped input data as selected data;

phase shifting the selected data by a phase shift associated with the predicted phase change to produce the phase shifted signal to the amplifier.

24. The method of claim 23 including:

delaying the shaped input data to produce a delayed shaped input signal;

receiving the shaped input data to produce shaped input magnitude data;

comparing the shaped input magnitude data with programmable threshold level data;

wherein the phase shift compensation and timing data includes phase data;

providing a timing signal in response to comparing the shaped input magnitude data with the programmable threshold level data; and producing the phase shifted signal in response to the delayed shaped input signal, the phase data, and the timing signal.

25. The method of claim 22 including:

producing shaped and shifted input data in response to the phase shifted signal; and producing the RF output signal by the amplifier in response to the shaped and shifted input signal.

* * * * *